United States Patent [19]
F'Geppert

[11] 4,272,998
[45] Jun. 16, 1981

[54] DRIVE MECHANISM

[75] Inventor: Erwin F'Geppert, Novi, Mich.

[73] Assignee: The United States of America as represented by the Secretary of the Army, Washington, D.C.

[21] Appl. No.: 118,044

[22] Filed: Feb. 4, 1980

[51] Int. Cl.³ .................... F16H 21/44; F16H 21/54
[52] U.S. Cl. .................................... 74/99 R; 74/96
[58] Field of Search ............... 74/63, 89, 99 R, 99 A, 74/89.14, 89.15, 109, 425

[56] References Cited

U.S. PATENT DOCUMENTS

| 265,411 | 10/1882 | Hartmann | 74/63 |
| 2,398,607 | 4/1946 | Weingart | 74/89 |
| 3,128,634 | 4/1964 | Eastman | 74/89.15 |
| 3,443,443 | 5/1969 | Spence | 74/99 |
| 3,698,258 | 10/1972 | Gartner | 74/89.15 |
| 3,730,008 | 5/1973 | Sheesley | 74/89.15 |
| 3,807,243 | 4/1974 | Yada | 74/63 |

FOREIGN PATENT DOCUMENTS

| 940337 | 1/1974 | Canada | 74/89.14 |
| 1127162 | 4/1962 | Fed. Rep. of Germany | 74/425 |
| 1750866 | 2/1970 | Fed. Rep. of Germany | 74/89.15 |
| 1650617 | 10/1970 | Fed. Rep. of Germany | 74/425 |
| 206256 | 6/1968 | U.S.S.R. | 74/89.15 |

Primary Examiner—Lawrence J. Staab
Attorney, Agent, or Firm—Peter A. Taucher; John E. Becker; Nathan Edelberg

[57] ABSTRACT

An elliptical wobble disk at its periphery engages a sine curve track, on a slide or on a drum, and slides the strip track or rotates the drum as a preferred alternative to a gear drive.

7 Claims, 11 Drawing Figures

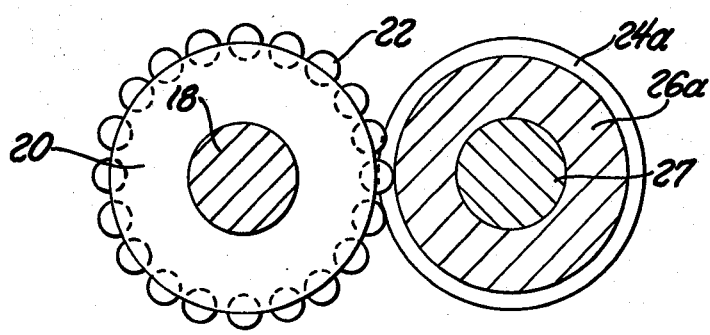
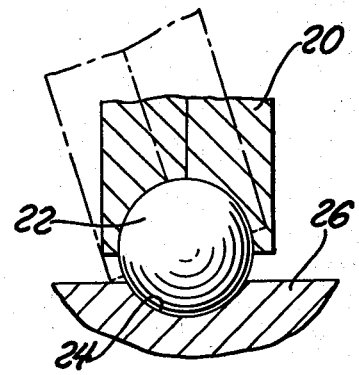
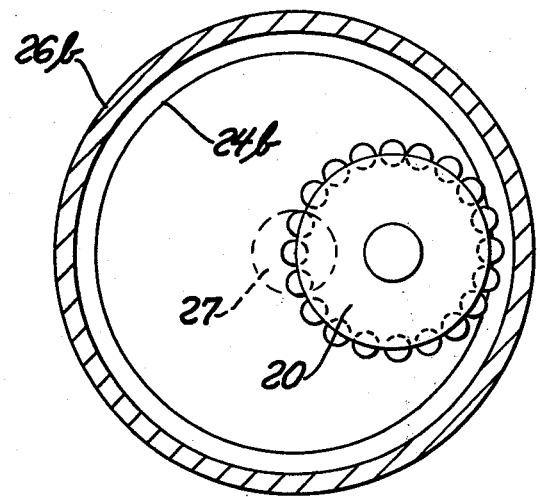
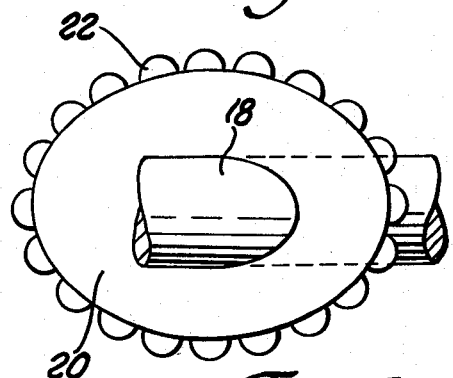
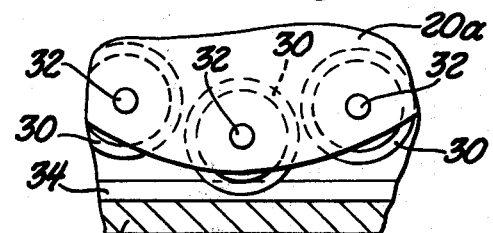
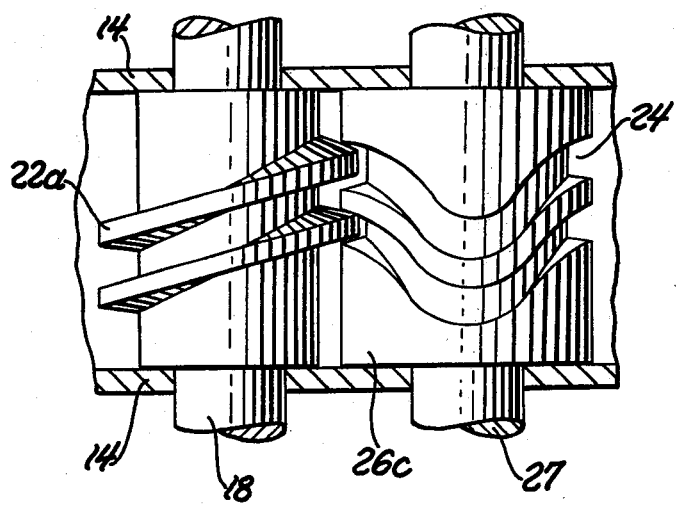
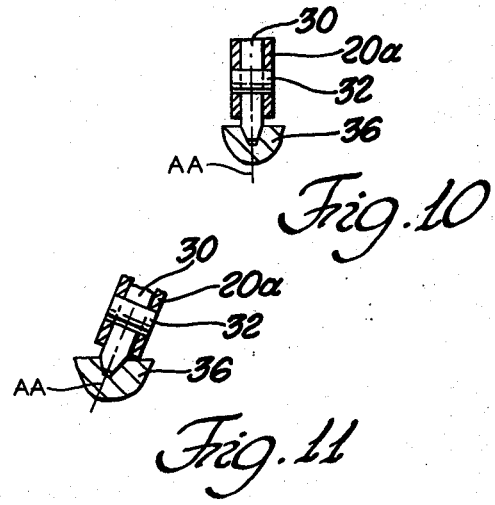
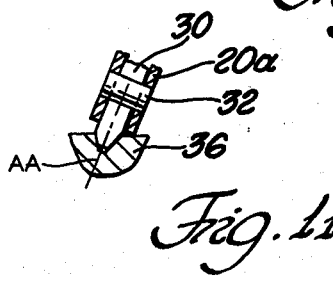

DRIVE MECHANISM

BACKGROUND AND SUMMARY OF PRIOR ART

The inventor and the attorneys know of no pertinent prior art. The invention here disclosed and claimed is a DRIVE MECHANISM which avoids some of the disadvantages of conventional gear drives, and an intended application is to military vehicles to reduce the signature of the equipment which is a function of noise generated during operation.

Gear drives operate with generation of high impact forces as the teeth make contact. Not only is the mechanical shock destructive of the involved gears, but it causes an undesirable level of noise. The noise is objectionable for at least three reasons: signature, i.e., early detection by enemy surveillance; damage to the hearing of crew members; and impairment of communication between crew members of any given equipment and between unit commanders and their several vehicles such as tanks, tank destroyers, missile launchers, and the like.

SUMMARY OF THE INVENTION

It is accordingly an object of the invention to provide a positive mechanical drive that generates less mechanical shock and noise than conventional gear drives without impairing either combat effectiveness or reliability.

That and other objectives are accomplished in a DRIVE MECHANISM in which an elliptical planar element carries rollers in a peripheral groove thereof; as the skew-mounted elliptical planar element wobbles on its shaft, the rollers (wheels or balls) engage a sinusoidal track and drive the track and its mounting base, which may be rectilinearly movable or may be wrapped about an axis of rotation for angular movement. In another embodiment, a tongue-and-groove combination is shown as the equivalent of a roller-and-groove drive.

The invention described herein may be manufactured, used, and licensed by or for the Government for governmental purposes without payment to me of any royalty thereon.

IN THE DRAWINGS

FIG. 4 shows another embodiment the invention may take, in which the rectilinearly movable track shown in FIG. 1 is wrapped around an axis of rotation, so that both elements are rotated during operation.

FIG. 5 shows an adaptation in which the rotatable track is on the inside of a drum rather than on the outside as in FIG. 4.

FIG. 6 is a view in section substantially on the plane of line 6—6 of FIG. 1.

FIG. 7 is a view from the plane of line 7—7 of FIG. 2.

FIG. 8 shows another adaption of two rotary elements, in which the ball-carrying element shown in FIG. 4 is replaced by a tongue, with the additional change of two sinusoidal tongues engaging two sinusoidal grooves;

FIGS. 9–11 show another embodiment wherein contact between the driving and driven elements is a series of small wheels.

DESCRIPTION: THE FIG. 1 EMBODIMENT

Figure 1:
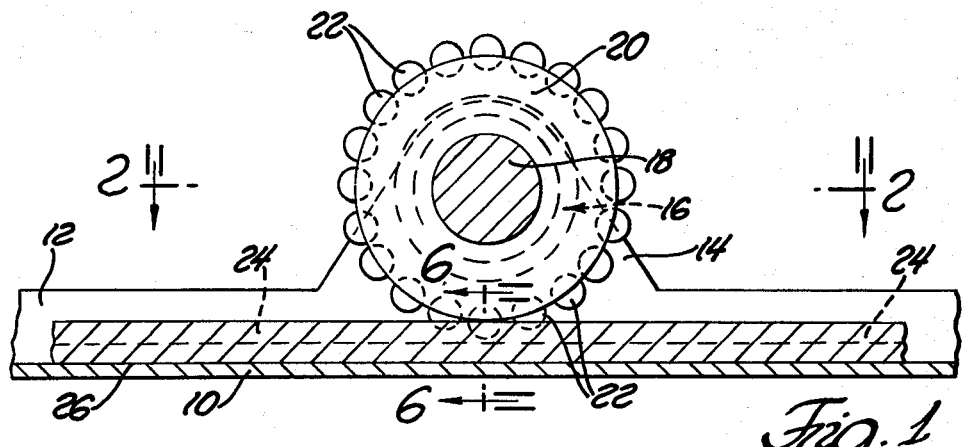
FIG. 1 is a view in section substantially on the plane of line 1—1 of FIG. 2.
Figure 2:
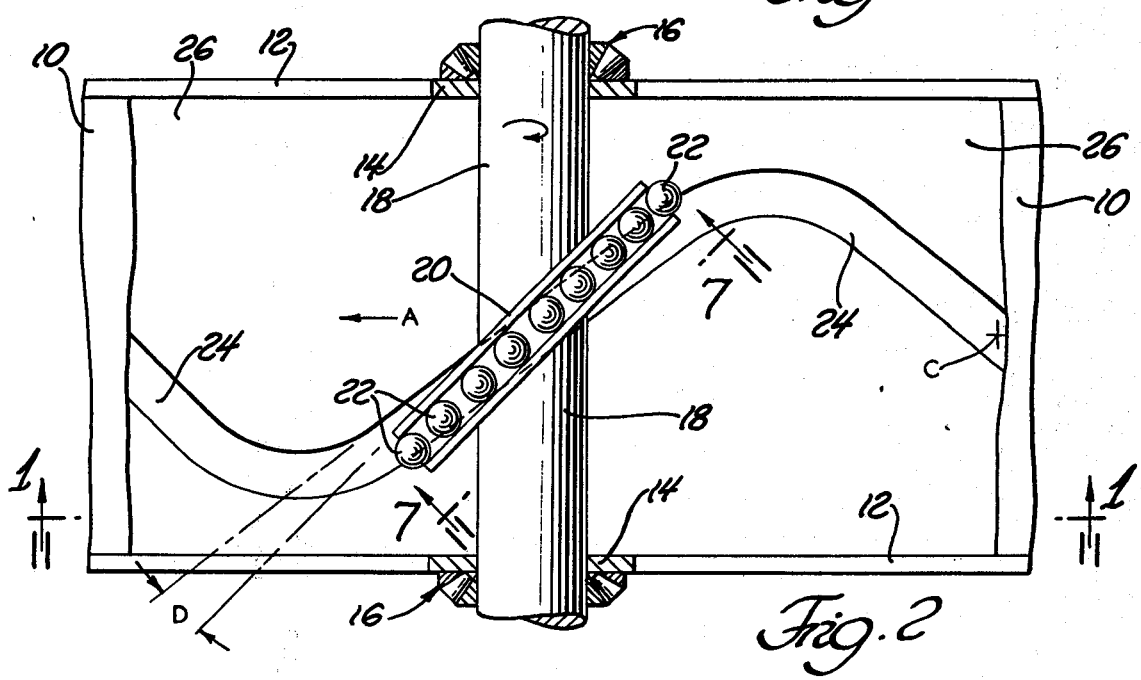
FIG. 2 is a view in section substantially on the plane of line 2—2 of FIG. 1.
Figure 3:
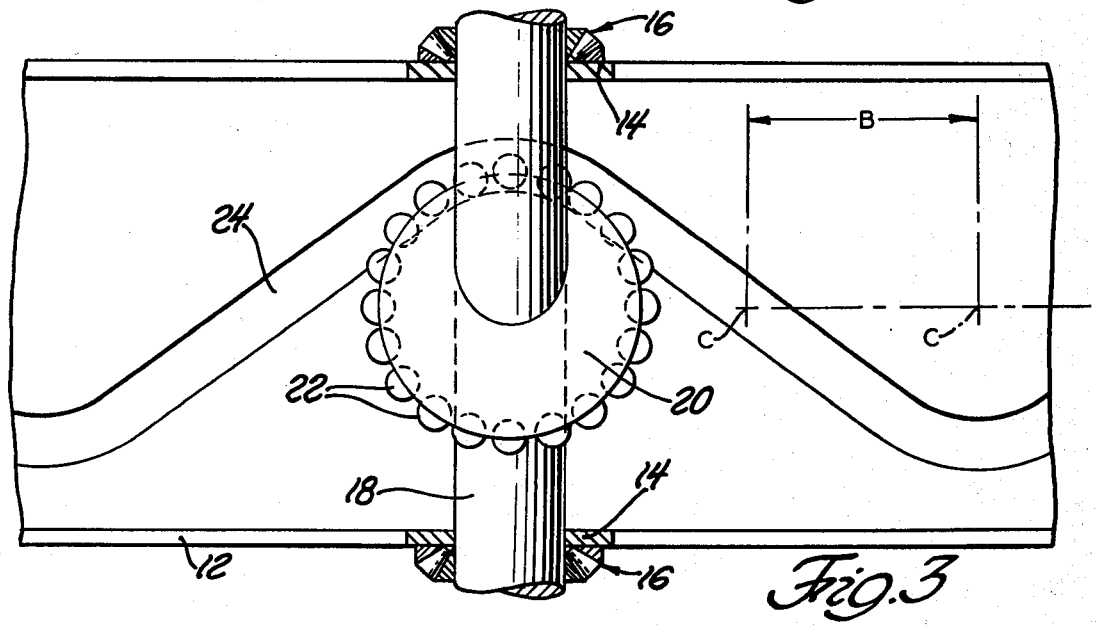
FIG. 3 is a view similar to FIG. 2 but with the shaft turned 90° from the position shown in FIG. 2.

The mechanism of FIGS. 1 through 3 comprises a fixed slideway 10 having upstanding walls 12 that define ears 14. Bearings 16 are carried by the ears to rotatably support a shaft 18. One end of the shaft is connectable to a motor or other power source, not shown. Bearings 16 are here shown schematically as tapered roller bearings so that they have the capacity to support radial and axial loads—the latter arising out of the axial bias which will be imposed on shaft 18 by the transverse component of the resistance to movement of the rectilinearly movable element.

Rigidly affixed to shaft 18 is a planar member 20, here shown as a cam disk, whose peripheral edge is grooved to from a raceway for anti-friction rollers, such as balls 22; the balls actually form cam surfaces. Member 20 is oriented so that balls located in the six o'clock position (FIG. 1) project into a groove 24 in a track element 26. As best seen in FIG. 2, disk 20 is skew mounted on shaft 18. Therefore, as shaft 18 is rotated about its axis the point of engagement between balls 22 and groove 24 shifts back and forth along a line parallel to the shaft axis.

Groove 24 describes a sine curve, as seen in FIGS. 2 and 3; balls 22 thus bear against one side or the other of groove 24, producing a linear sliding motion of track element 26 within slideway 10 in the arrow A direction (when the shaft is rotated clockwise). FIG. 3 illustrates the linear displacement B of point C on element 26 achieved by one quarter revolution of shaft 18, showing shift of point C from its FIG. 2 position to its FIG. 3 position.

In order that balls 22 maintain proper engagement with track 24 it is necessary that disk 20 be elliptical (rather than circular); FIG. 7 shows the ellipse for the disk of FIG. 2. The ellipse dimension is designed so that the balls in the six o'clock position are at a constant given distance below the axis of shaft 18 (FIG. 1); ellipse dimensions are related to the skew angle of disk 20 (FIG. 2).

During each complete revolution of shaft 18 track element 26 will be displaced linearly the same distance as the travel of track engagement surface of disk 20 (e.g. defined by balls 22). The engagement between balls 22 and the track 24 surface is essentially a continuous cam engagement wherein each ball approaches (and leaves) the track surface at a relatively slight angle. In FIG. 2 this approach angle is designated by letter D. The low approach angle achieved by the cam type force transmission tends to reduce the impact forces as each ball moves from an unloaded condition to a loaded condition. The lessened impact forces will produce less noise (which is a primary feature of the invention).

THE EMBODIMENTS OF FIGS. 4, 5 AND 8

In the FIG. 4 embodiment of the invention the track element 26 (of FIG. 1) is replaced by a barrel 26a; the surface of the barrel is grooved to provide a sinuous track 24a. A shaft 27 extends through the barrel to mount same for rotation around the shaft axis. Operation of the FIG. 4 embodiment is the same as that of FIG. 1 except that the driven element (e.g. barrel 26a) rotates rather than slides. FIG. 5 is generally similar to FIG. 4 except that the simuous groove is formed on the inner surface of a hollow barrel (rather than on the external surface of a solid barrel).

FIG. 8, with its barrel 26c, is similar to FIG. 4 except for two factors. First, the cam surface is defined by a continuous external rib 22a (rather than a succession of balls 22). Second, two cam surfaces are used instead of one. The number of cam-cam follower systems is primarily a function of the load to be carried. Use of ribs (instead of balls) is believed to be a matter of economics (balance between cost and having the anti-friction feature).

In the embodiment of FIGS. 1-3 and 6, 7, the rollers are closely-spaced balls 22 moving in a shallow groove 24. That embodiment is satisfactory when relatively light forces are transmitted; when extremely heavy forces are applied to such a system, the balls tend to jump or climb out of the groove. The FIG. 8 embodiment gives greater strength to the drive but adds friction. Where the added friction would be a problem but substantial forces must be transmitted, the embodiment of FIGS. 9-11 is useful. There, a cam disk 20a, similar to cam disk 20, carries peripherally mounted rollers in the form of wheels 30 which are rotatable on shafts 32 secured in disk 20a.

The embodiment of FIGS. 9-11 also illustrates the variable attitude of groove 34 in slide 36. As is best seen in FIGS. 10 and 11, except for the clearance at the bottom of the groove, the edges of wheels 30 and groove 34 have substantially identical contours (profiles), which feature gives the strength of the FIG. 8 embodiment but with less friction. For a more comprehensible discussion of this feature, I have shown in FIGS. 10 and 11 what I call the attitudinal axis AA.

Axis AA is an axis of symmetry which passes thru the centers of disk 20a and shaft 32 and lies in the plane midway between and parallel to the sides of disk 20a and wheels 30. The wheel profile is always symmetrical about axis AA, and the groove profiles are symmetrical about axis AA of each wheel 20a at the time and position of maximum engagement between the wheel and the groove. That maximum engagement occurs when the line of centers is perpendicular to the track; see FIGS. 10 and 11.

Accordingly, the best mode of the invention calls for the track or groove profile to conform to the attitudinal axis as defined above throughout the total path of wheel travel as the wheel engages the track (herein the groove 34) in slide 36. This means that the angle which the attitudinal axis makes with the surface of slide 36 varies as disk 20a moves from one extreme position of the amplitude of the sinuous track to the other.

OPERATION

As the wobbling disk 20 rotates with shaft 18, the rollers (balls 22) cam the track element 26 in a direction perpendicular to the axis of rotation of shaft 18, imparting translatory movement to track element 26 (or rotation to drum 26a, 26b, 26c).

It is submitted that the primary advantages of this invention over conventional gear drives are:
1. lessened impact forces on the drive-driven elements, hence lessened wear;
2. less noise;
3. different sonic signature (to confuse enemy forces);
4. possibly simpler to manufacture (one rib versus several teeth);
5. possibly more efficient (due to use of anti-friction elements); and
6. possibly greater load capacity (if multiple ribs are used).

In the above discussion of the embodiment of FIGS. 9-11, reference was made to clearance between the wheel peripheral edges and the bottom of the groove. Such clearance is provided so that wheel contact is always with the groove sides.

I wish it to be understood that I do not desire to be limited to the exact details of construction shown and described for obvious modifications will occur to a person skilled in the art.

What is claimed is:

1. Means to transmit motive power between two movable machine elements, one of which rotates about a fixed axis and the other of which moves along a path perpendicular to said axis, comprising:
   a. a planar member mounted on the first-named element to rotate about said axis and having a peripheral groove,
   b. a plurality of rollers disposed in said peripheral groove,
   c. a track in the second-named element adapted to cooperate with the rollers of the planar member to transmit force between the planar member and the track, and
   d. the planar member being skew mounted on the first-named element and having a non-circular shape whereby said rollers are always in engagement with the track as the first-named element rotates and the track moves.

2. Motive power transmitting means as in claim 1, wherein the elements have an attitudinal axis defined by a line lying in a plane midway between the sides of the planar member and intersecting the axis of rotation of the planar member and the center of rotation of any of the rollers, the planar member and the track profiles being always symmetrical about the attitudinal axis at the position of maximum engagement of a roller in the track.

3. Means to change the direction of an applied force from a first direction to a second direction, one of the two directions being rotary and the other of the two directions being rectilinear, comprising:
   a. a rotatably mounted shaft element,
   b. a track element mounted for translatory movement and provided with a sinusoidal groove,
   c. an elliptically shaped planar member skew mounted on the shaft for rotation therewith and having a peripheral groove,
   d. a plurality of rollers rotatably mounted in the peripheral groove and engageable seriatim with the sinusoidal groove as the shaft turns,
   e. the elliptical shape of the planar member and the skew angle which the planar member makes with the shaft axis being such that each roller engages the sinusoidal groove as the shaft turns.

4. Means to change the direction of an applied force from a first direction to a second direction, one of the two directions being rotary and the other one of the two directions being rectilinear, in combination:
   a. a support comprising an elongated flat member having right-angle flanges at its opposite edges,
   b. a pair of opposed mounting ears integral with their respective flanges,
   c. a bearing mounted on each mounting ear, the rotational axes of the two bearings being coincident and each bearing being able to support radial and axial loads, d. a shaft rotatably mounted in the bearings, e. an elongated machine element rectilinearly movable on the support between said flanges at right angles to the axis of rotation of the shaft and spaced from the shaft, f. a track formed in that surface of the elongated machine element which is closer to the shaft and comprising at least in part a sinusoidal groove in said surface, g. an elliptically shaped planar member skew mounted on the shaft for rotation therewith and having a peripheral groove, h. a plurality of rollers rotatably mounted in the peripheral groove and engageable seriatim with the sinusoidal groove as the shaft turns, i. the elliptical shape of the planar member and the skew angle which the planar member makes with the shaft axis being such that each roller engages the sinusoidal groove as the shaft turns.

5. Motive power transmitting means as in claim 3 or claim 4, wherein the elements have an attitudinal axis defined by a line lying in a plane midway between the sides of the planar member and intersecting the axis of rotation of the planar member and the center of rotation of any of the rollers, the profiles of the planar member and the sinusoidal groove being always symmetrical about the attitudinal axis at the position of maximum engagement of a roller in the sinusoidal groove.

6. Means to transmit motive power between two movable machine elements, one of which rotates about a fixed axis and the other of which moves along a path perpendicular to said axis, comprising:

a. a planar member mounted on the first-named element to rotate about said axis, b. a track in the second-named element, c. a radially-outward extending projection on the planar member adapted to engage and cooperate with said track to transmit force between the planar member and the track, d. the planar member being skew mounted on the first-named element and having a non-circular shape whereby said projection is always in engagement with the track as the first-named element rotates and the track moves, and e. the elements having an attitudinal axis defined by a line lying in a plane midway between the sides of the planar member and intersecting the axis of rotation of the planar member and perpendicular to the track, the profiles of the planar member and the track being always symmetrical about the attitudinal axis at any position of maximum engagement of the projection and the track.

7. Means to transmit motive power between two movable machine elements, at least one of which rotates about a fixed axis, comprising:

a. a planar member mounted on said at least one element to rotate about said axis, b. a track in the remaining element, c. a radially-outward extending projection on the planar member adapted to engage and cooperate with said track to transmit force between the planar member and the track, d. the planar member being skew mounted on the first-named element and having a non-circular shape whereby said projection is always in engagement with the track as the first-named element rotates and the track moves, and e. the elements having an attitudinal axis defined by a line lying in a plane midway between the sides of the planar member and intersecting the axis of rotation of the planar member and perpendicular to the track, the profiles of the planar member and the track being always symmetrical about the attitudinal axis at any position of maximum engagement of the projection and the track.

* * * * *